(12) United States Patent
Ryan et al.

(10) Patent No.: US 7,860,252 B2
(45) Date of Patent: Dec. 28, 2010

(54) CIRCUIT SECURITY

(75) Inventors: Stuart Andrew Ryan, Bristol (GB); Andrew Michael Jones, Bristol (GB)

(73) Assignee: STMicroelectronics (Research & Development) Limited

( * ) Notice: Subject to any disclaimer, the term of this patent is extended or adjusted under 35 U.S.C. 154(b) by 966 days.

(21) Appl. No.: 11/682,821

(22) Filed: Mar. 6, 2007

(65) Prior Publication Data
US 2008/0170694 A1 Jul. 17, 2008

(30) Foreign Application Priority Data
Mar. 6, 2006 (EP) .................................. 06251192

(51) Int. Cl.
*H04L 9/28* (2006.01)
(52) U.S. Cl. ..................... 380/277; 380/28; 711/212; 713/193; 713/194; 713/176; 713/170; 365/189.17
(58) Field of Classification Search ........................ None
See application file for complete search history.

(56) References Cited

U.S. PATENT DOCUMENTS

| | | | |
|---|---|---|---|
| 5,790,669 A | 8/1998 | Miller et al. | |
| 6,401,208 B2 * | 6/2002 | Davis et al. | 713/193 |
| 6,571,335 B1 * | 5/2003 | O'Donnell et al. | 713/173 |
| 2009/0150923 A9 * | 6/2009 | Patariu et al. | 725/31 |

* cited by examiner

*Primary Examiner*—Nasser Moazzami
*Assistant Examiner*—Fikremariam Yalew
(74) *Attorney, Agent, or Firm*—Lisa K. Jorgenson; Timothy L. Boller; Seed IP Law Group PLLC

(57) ABSTRACT

A system is provided in which a first circuit is protected by security features provided by a second circuit. The first circuit comprises a processor which retrieves content from a memory. Initially, the contents of the memory are authenticated using security features of the second circuit to check that the processor is accessing authenticated content. To maintain security during use, the second circuit checks that the processor is accessing content from valid regions of the memory, being those that have been authenticated, and rechecks the authenticity of the content of the valid regions of memory. The combination of checking that the processor is accessing from valid regions of the memory and authenticating the content stored in the valid regions maximizes the security of the system. If any of the checking or authentication steps fail then operation of the system is impaired. The first circuit is thus protected by security features provided by the second circuit.

38 Claims, 2 Drawing Sheets

CIRCUIT SECURITY

BACKGROUND OF THE INVENTION

1. Field of the Invention

The present invention relates to circuits used in devices which require security features to prevent unauthorized access to data used within the device.

2. Description of the Related Art

In many devices, there is a need to provide security features to protect unauthorized access to data used within the device. For example, in the field of television broadcasting, access to certain broadcast services may require payment of a fee or subscription. Such a scheme is often referred to as pay-television. Access to the broadcast services by those persons not having paid the appropriate fees or subscription is prevented by encrypting or scrambling the broadcast signals. The encrypted or scrambled broadcast signals may be decrypted or descrambled using a set-top-box storing the appropriate decryption keys and any other necessary decryption or descrambling data. Only when the appropriate fee or subscription is paid are the correct decryption keys provided to a user's set-top-box thereby allowing the broadcast signals to be decrypted or descrambled. The security of this system therefore relies on the confidentiality of the decryption keys and other decryption or descrambling data.

In order to prevent hackers from obtaining secret decryption keys and other decryption or descrambling data stored in a set-top-box, various security features are provided. Since the overall commercial viability of pay-television relies on payment of fees and subscriptions and restricting access to broadcast services accordingly, the security features provided in a set-top-box are typically extensive providing a high degree of security. However, providing such extensive security requires the provision of many additional components which increases the overall complexity of the system and increases design and manufacturing costs.

One example of a security feature is the process of verifying the authenticity of the contents of a memory in which system software, for example, is stored. A hacker may attempt to breach the security of the system be replacing legitimate system software with illegitimate software which causes securely stored decryption keys to be routed to insecure areas of the system from which they may be easily accessed. A piece of software stored in the memory may be authenticated by a device, for example, by comparing a first hash value computed by the device from the software code with a second hash value determined by decrypting a signature stored in association with the software. The signature comprises a valid hash value encrypted using a secret encryption key so that only authorized parties (typically the software producer) can generate valid signatures for a given piece of software. If the two hash values match then the software may be considered to be authentic.

With the continuing development of high-speed Internet access, it is becoming increasingly common to access digital television and other broadcast services via cable modems. Previously, cable modems have been used to access traditional Internet services only, which have less tendency to be hacked. For this reason, cable modems typically provide far fewer security features than set-top-boxes and so are much less secure. This causes the problem that when digital television and other broadcast services are accessed via cable modems, they are much more susceptible to hacking.

One solution to this problem is to provide cable modems with the additional security features typically provided in a set-top-box. However, as mentioned above, this greatly increases the cost and complexity of design and manufacturer resulting in a greater cost to the consumer.

BRIEF SUMMARY OF THE INVENTION

We have appreciated the need to provide devices such as cable modems used to access and store secure data with sufficient degree of security while maintaining relatively low design and manufacturing costs. We have further appreciated that a first device, such as a cable modem, may take advantage of security features provided by a second device, such as a set-top-box, without requiring the addition of the full set of components used in the second device to provide those security features.

The invention is defined in the independent claims to which reference may now be made. Preferred features of embodiments of the invention are set out in the dependent claims.

In an embodiment of the invention, a second circuit provides security features not provided by a first circuit. The first circuit comprises a processor which retrieves content from a memory. Initially, the contents of the memory are authenticated using security features of the second circuit so that the processor accesses authenticated content. To maintain security during use, the second circuit checks that the processor is accessing content from valid regions of the memory, being those that have been authenticated, and re-checks the authenticity of the content of the valid regions of memory. The combination of checking that the processor is accessing from valid regions of the memory and authenticating the content stored in the valid regions maximizes the security of the system. The first circuit is thus protected by security features provided by the second circuit.

In one embodiment, the first circuit maintains a running hash value of content received from the memory. The content received by the first circuit is transmitted to the second circuit which maintains a corresponding running hash value. The first circuit stores the minimum and maximum memory addresses of instructions executed by the processor. The running hash value maintained by the first circuit and the minimum and maximum addresses stored by the first circuit are appended and the result encrypted according to a secret encryption key to generate a signature. The signature is transmitted to the second circuit where it is decrypted using a corresponding decryption key. The running hash value contained in the signature is compared to the running hash value maintained by the second circuit. The minimum and maximum addresses contained in the signature are compared to one or more valid regions. If either of these comparisons fail then the operation of the system is impaired. When all relevant content has been received by the second circuit, a content authentication check is performed. If this content authentication check fails, operation of the system is impaired.

DETAILED DESCRIPTION OF THE INVENTION

Figure 1:
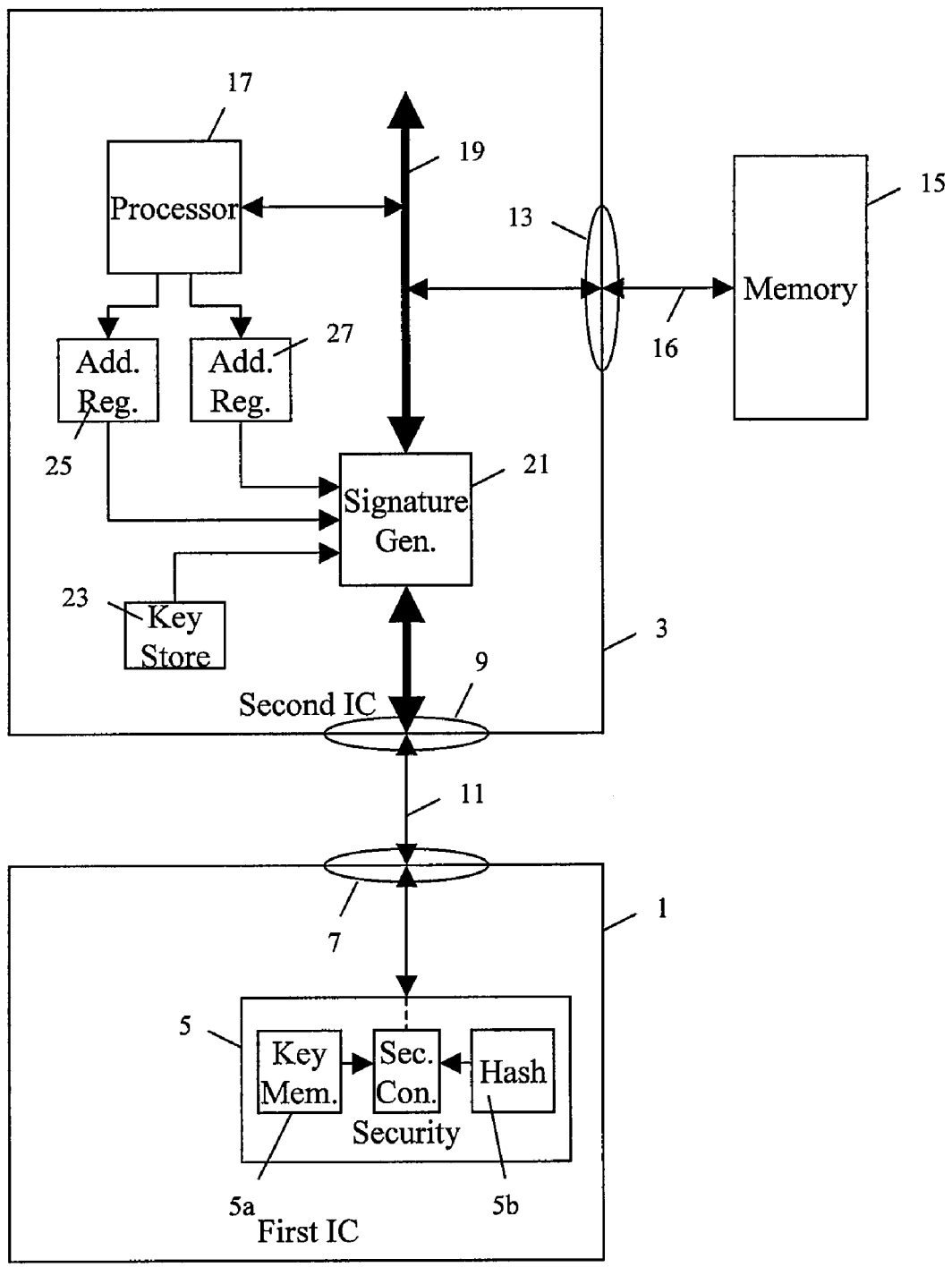
FIG. 1 is a schematic diagram of a system embodying the invention.

FIG. 1 is a schematic diagram of a system embodying the invention. The system comprises a first circuit 1 and a second circuit 3. The first circuit may be referred to as the primary circuit and the second circuit may be referred to as the companion circuit. The primary circuit may be, for example, an existing circuit design used in a set-top-box and the companion circuit may be, for example, one having cable modem capabilities. The primary and companion circuits may be contained within the same device, or separate devices. The primary circuit comprises a set of components providing various security features which may be referred to collectively as a security block 5. In the illustrated embodiment the companion circuit does not comprise a similar security block and so is not capable, by itself, of providing the security features. However, the absence of the security block in the companion circuit lowers the overall design and manufacturing costs.

The software and other data used to control the companion circuit is stored in an external memory 15 in the form of computer executable code. The companion circuit accesses the memory via a bus 16 which connects the memory to a memory interface 13 of the companion circuit. Code retrieved from the memory is executed by a processor 17 which receives instruction transmitted to the memory interface via an interconnect bus 19. During operation, computer executable code is retrieved from the memory 15, transmitted to the companion circuit 3 via the bus 17 and memory interface 13, then transmitted via the interconnect bus to the processor for execution. Other forms of data requested by the processor may also be stored in the memory.

In order to maintain security of the companion circuit it is desirable to ensure that the software and other data stored in the memory used by the processor is authentic. The companion circuit, by itself, is not capable of performing this task. However, the security block of the primary circuit is capable of verifying the authenticity of the software. For example, the software may be stored in the memory in association with a digital signature. A valid digital signature comprises a hash value of the software encrypted according to a secret encryption key. The hash value may be computed for example using a predetermined hash function such as SHA-1. The encryption key may be, for example, the private key part of an anti-symmetric cryptographic transform. In order to verify the authenticity of the software the security block computes a first hash value from the software using the same hash function as that used to generate the digital signature. The security block also decrypts the stored digital signature using a decryption key to produce a second hash value. The decryption key may be, for example, the public key part of the anti-symmetric cryptographic transform. If the first and second hash values match then the digital signature and the software validly correspond to each another and the software may be considered authentic. If the legitimate software was modified or replaced by a hacker then the stored signature and the software would not validly correspond with each other and the verification process would fail. The hacker could not generate a valid signature for the modified or replaced software because the encryption key used to generate signatures is secret.

The authenticity of the contents of the memory may be verified in this way before the processor executes any software or uses any other data stored in the memory.

In order to maintain security of the companion circuit whilst avoiding the addition of a hardware block, the companion circuit uses the hardware block of the primary circuit to perform the software authentication check. Preferably, the process of initiating authentication checks is performed by the primary circuit because the primary circuit has a high degree of security. The security block receives the instructions for verification via the companion circuit to ensure that the instructions received by the companion circuit are also those received at the primary circuit for verification. The primary circuit and the companion circuit each comprise an external interface which are connected by a bus 11 to enable data to be transferred between the companion circuit and the primary circuit. The external interface of the companion circuit is connected to the interconnect bus so that instructions present on the interconnect bus may be transmitted to the primary circuit via the external interfaces and the bus 11. The external interface of the primary circuit is connected to the security block so that those instructions received by the primary circuit from the companion circuit may be authenticated. When the security block performs an authentication check of the contents of the memory the security block transmits a command causing the relevant contents of the memory to be retrieved via a pathway through the memory interface, the interconnect bus, the external interface of the companion circuit, the bus 11, the external interface of the primary circuit and then to the security block.

Once the primary circuit has received the relevant contents of the memory requiring verification, the security block performs the authentication check using the received content and the associated signature stored in the memory.

A hacker may attempt to overcome the security of the system by replacing the legitimate software and other data in the memory with illegitimate software and data. In order to overcome the authentication check, the hacker may then feed a copy of the authentic software and data to the primary circuit via the external interface of the primary circuit during the authentication check. In order to prevent this attack, the following additional security feature may be used to verify that the memory content being authenticated by the primary device is the same as that received by the companion circuit from the memory. The companion circuit comprises a signature generator 21 located between the interconnect bus and the external interface of the companion circuit. The stream of data flowing between the memory and the security block is thus intercepted by the signature generator. The signature generator is arranged to maintain a running hash or digest of the data that has been intercepted by it and, on command, to generate an intermediate signature from the running hash. The intermediate signature may be, for example, an encrypted version of the running hash encrypted according to a secret encryption key. The encryption key is stored in a key store 23 and received at an input of the signature generator. In one embodiment, in order to maintain a running hash value, each time a portion of data is received by the signature generator, an updated running hash value is generated using the received portion of data together with stored information representing the previous state of the hash function. In another embodiment, the signature generator stores an accumulation of the instructions that has been intercepted by it, and when an intermediate signature is generated, a hash value of the accumulation of instructions is then computed.

The security block of the primary circuit is also arranged to maintain a corresponding running hash or digest 5b of the data received from the companion circuit in a similar manner to that of the signature generator. The signature generator of the companion circuit and the security block of the primary circuit are maintained in synchronization so that at any time, the respective stored running hash values are the same in the companion and primary circuits.

At a time determined by the primary circuit, the security block transmits a signal to the companion circuit commanding the signature generator to generate an intermediate signature and to transmit this back to the primary circuit. The security block also retrieves the running hash value maintained by the security block. The time at which this process occurs may, for example, be determined randomly by the security block to ensure that it is unpredictable to hackers. Alternatively, this process may occur at a predetermined time, and may occur periodically.

When the primary circuit receives the intermediate signature, the security block decrypts it using a stored decryption key, stored in memory 5a, to obtain another running hash value maintained by the signature generator. A comparator in the security block is arranged to compare the two running hash values, and if they match this provides the primary circuit with a verification that the data received by it are those that have passed through the signature generator of the companion circuit. Since the encryption key used to generate intermediate signatures is secret and generation of a valid intermediate signature requires knowledge of the correct encryption key, the intermediate signature provides the primary circuit with a verification that the data received by the primary circuit has originated from the companion circuit and not fed from a hacker. This verification process may be repeated, for example, until the entire software has been authenticated.

In an alternative embodiment, rather than decrypting the intermediate signature received from the companion circuit and comparing running hash values, the security block encrypts the running hash value maintained by the primary circuit using the same encryption key stored in the companion circuit and compares the encrypted hash with the intermediate signature itself.

The data used to generate intermediate signatures may comprise instructions forming software stored in the memory, the memory addresses of the instructions, other forms of data such as encrypted secrets and authentication certificates, or any combination of these.

In one embodiment, the encryption and decryption keys used by the companion circuit and primary circuit to encrypt and decrypt the hash value forming the intermediate signature are the private and public keys in an anti-symmetric cryptographic transform such as RSA. In another embodiment, the encryption and decryption keys are the same cryptographic key in a symmetric cryptographic transform. Using symmetric cryptography is typically less secure than using anti-symmetric cryptography but is less expensive in terms of computation. In one embodiment, a weak hash function may be used in order to reduce the computation time required to compute the hash values. Preferably, the parameters used in the hash function are secret to maximize security.

A hacker may attempt to overcome the security of the system by feeding a previously generated valid intermediate signature, or an intermediate signature generated by an uncompromised system, to the primary circuit. In order to prevent this attack, the signature generator is arranged to incorporate a unique number into each intermediate signature generated. The unique number may be for example a value representing the time at which the companion device was commanded to generate the intermediate signature. The number may also be unique to the particular companion circuit. The unique number may be a random number generated according to a specified seed by a random number generator comprised in the signature generator or security block.

The uniquely generated number is appended to the hash value by the signature generator before being encrypted to form the intermediate signature. When the security block decrypts the intermediate signature, the unique number comprised in the signature is compared to the expected value, for example the value representing the time at which the primary circuit commanded the companion circuit to generate the intermediate signature. In the case that the unique number is a random number generated by the signature generator, the circuit in which the number was generated transmits the number to the other circuit. If the actual value matches the expected value then this provides an indication that the intermediate signature is valid rather than being a copy of a previously generated signature for example. If an invalid signature were used then the unique numbers would not match. The incorporation of a unique number into each intermediate signature is particularly preferable when intermediate signatures are generated and transmitted at predetermined times or periodically. However, unique numbers may also be used when the intermediate signatures are generated at random times.

The authentication check performed by the security block of the primary circuit ensures that the contents of the memory are valid. However, although the contents of the memory are authenticated, it is important to ensure that the data actually used by the processor is the same as the data authenticated. A further security feature provided by the security block of the primary circuit is that of determining whether an instruction retrieved from the memory has been retrieved from a valid location in memory. Typically, particular system software is stored and executed from a specific location in memory. A hacker may attempt to load illegitimate software into a second region of memory and cause the system to execute instructions retrieved from the second region. This could result in illegitimate software being executed even though the system has properly verified the authenticity of the software stored in the valid region of memory. Therefore, in order to further increase the security of the system, it is desirable to ensure that instructions executed by the processor have been retrieved from a valid location. This is achieved by monitoring the addresses of the data, such as computer executable instructions, used by the processor and determining whether these addresses fall within one or more valid regions of memory.

It may not be possible for the primary circuit to directly access the address bus for fetches from the memory by the processor to enable checking of the memory addresses. Accordingly, a mechanism is provided in which the companion circuit passes information to the primary circuit in a secure manner which is representative of the memory addresses of memory content requested by the processor. The companion device further comprises a first address register 25 and a second address register 27 which are accessible and modifiable by the processor 17. The first address register is used to store the minimum memory address from which instructions executed by the processor have been retrieved and the second address register is used to store the maximum memory address from which instructions executed by the processor have been retrieved. The first and second address registers thus define a range representing a region of memory from which instructions executed by the processor have been retrieved. As the processor receives and executes each instruction, the processor compares the address from which each instruction was retrieved and compares this with the contents of the first and second address registers. If the memory address of an instruction is less than the value stored in the first address register then that address replaces the value stored in the first address register. If the memory address of an instruction is greater than the value stored in the second address register then that address replaces the value stored in the second address register. The process of updating the registers as instructions are executed by the processor is performed autonomously by hardware to ensure maximum security.

Figure 2:
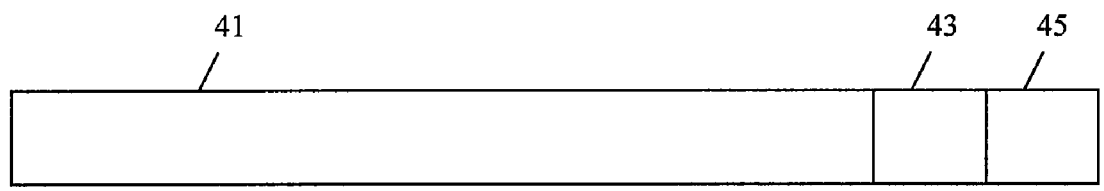
FIG. 2 is a schematic diagram of a digital signature.

The signature generator receives the values stored in the first and second address registers via two inputs. When the signature generator generates an intermediate signature, the two values stored in the first and second address registers are incorporated into the intermediate signature. For example, the two values may be appended to the hash value computed by the signature generator before encryption. FIG. 2 is a schematic diagram of an intermediate signature before encryption comprising a first field 41 containing the hash value and second and third fields 43, 45 containing the values stored in the first and second address registers. When the intermediate signature is received by the primary circuit and decrypted, the two values are extracted to determine whether the range defined by the two values falls entirely within a valid region of memory. The valid region may be defined by the security block by two stored values representing the highest and lowest memory addresses of the valid region. If either of the two values comprised in the intermediate signature fall outside the valid region of memory, then the security circuit determines that at least some of the instructions executed by the processor were not retrieved from the valid region of memory. In other embodiments, two or more valid regions of memory may be defined using multiple pairs of values stored by the security block.

In one embodiment, separate intermediate signatures may be used to transmit the values stored in the address registers and to transmit the running hash values.

The process described above of checking the memory addresses of content used by the processor may be performed independently of the process of verifying the authenticity of the memory content. In one embodiment, a check of the contents of the memory is performed before it is used. Following this initial check, the processor retrieves and uses memory content, for example by executing instructions stored in the memory. As the processor retrieves memory content, the present invention may be used to check that the content being retrieved by the processor is stored within a valid region of the memory and which has thus been authenticated. While the processor is retrieving and using memory content the present invention may also be used to continually re-authenticate the memory contents of the valid region. This combination of authenticating memory content stored in valid regions and ensuring that the processor retrieves and uses only content stored within valid regions provides a high degree of security to the system.

Preferably, the primary and companion circuits are each monolithic devices. This prevents hackers from feeding data into or reading data out of the system, re-routing data, or from replacing components within the system.

If any of the security, validation or authentication checks performed by the security block, including those described above, fail, then the security block causes functioning or operation of the system to be impaired. Impairment of operation is performed to protect the system in the event that the system is compromised. For example, the security block may cause a system reset to occur for either or both of the primary and companion circuits. Impairment of the system may also include, for example, restricting access by the companion circuit to its resources. Functioning of the system may be impaired, for example, if any the memory locations from which data has been retrieved are not legal, if the contents of the memory are not properly authenticated or if any of the intermediate signature checks fail.

Although the examples of circuit used in set-top-boxes and cable modems are mentioned above, it is understood that the present invention may be applied to any system in which one circuit is capable of providing security features which another circuit may wish to utilize. It is also understood that the present invention may be used to allow a circuit to utilize security features of another circuit other than those mentioned above.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A system, comprising:
a first integrated circuit that includes:
a memory interface configured to receive content from a memory;
a processor configured to request content from the memory;
a verification block configured to maintain a first running value derived from content received from the memory and further arranged to transmit, in a form processed according to a first cryptographic process, the first running value and information representing memory addresses in the memory of the content requested by the processor; and
a second integrated circuit in which security features are provided, the second integrated circuit including:
a security block configured to verify content received from the first integrated circuit, to maintain a second running value derived from content received from the first integrated circuit, and to operate a second cryptographic process corresponding to the first cryptographic process to verify that the first running value corresponds to the second running value and to verify that the memory addresses of the content requested from the memory by the processor are within a specified region, the security block being further configured to impair the operation of the first integrated circuit if the first running value does not correspond to the second running value or if the memory addresses of the content requested from the memory by the processor are not within the specified region.

2. The system of claim 1 in which the content comprises computer executable instructions.

3. The system of claim 1 in which the content comprises data.

4. The system of claim 1 in which the first and second running values comprise running hash values of content.

5. The system of claim 1 in which the first and second running values comprise hash values of an accumulation of content.

6. The system of claim 5 in which the hash values are computed using a SHA function.

7. The system of claim 1 in which the first cryptographic process comprises an encryption process.

8. The system of claim 7 in which the encryption process is performed according to a stored encryption key.

9. The system of claim 7 in which the cryptographic process is the RSA algorithm.

10. The system of claim 1 in which the second cryptographic process is the same as the first cryptographic process.

11. The system of claim 1 in which the second cryptographic processes comprises a decryption process.

12. The system of claim 11 in which the first and second cryptographic processes are anti-symmetric cryptographic processes.

13. The system of claim 1 in which the information representing the memory addresses of the content requested by the processor and processed according to the first cryptographic process is transmitted to the second integrated circuit as a first digital signature.

14. The system of claim 13 in which the first running value processed according to the first cryptographic process is transmitted to the second integrated circuit as a second digital signature.

15. The system of claim 1, in which the information representing the memory addresses of the content requested by the processor and the first running value are transmitted to the second integrated circuit in the same digital signature.

16. The system of claim 15 in which the digital signature includes a unique number.

17. The system of claim 16 in which the unique number represents the time at which the digital signature was generated.

18. The system of claim 1 in which one of the integrated circuits includes a store configured to hold minimum and maximum memory addresses of the memory from which content is requested by the processor and wherein the information representing the memory addresses of the content requested by the processor comprises the minimum and maximum memory addresses.

19. The system of claim 18 in which the store is modifiable by the processor.

20. The system of claim 1 in which impairing of the operation of the first integrated circuit includes performing a system reset.

21. The system of claim 1 in which impairing of the operation of the first integrated circuit includes restricting access to one or more resources.

22. The system of claim 1 in which the first integrated circuit is configured to transmit the first running value and information representing the memory addresses in the memory of the content requested by the processor in response to a request from the second integrated circuit.

23. The system of claim 22 in which the second integrated circuit is configured to transmit the request to the first integrated circuit at a random time.

24. The system of claim 22 in which the second integrated circuit is configured to transmit the request to the first integrated circuit at a predetermined time.

25. The system of claim 22 in which the second integrated circuit is configured to transmit the request to the first integrated circuit periodically.

26. The system of claim 1 in which the specified region is non-contiguous.

27. The system of claim 1 in which the first and second integrated circuits are monolithic devices.

28. The system of claim 1 in which the first integrated circuit has cable modem capabilities.

29. The system of claim 1 in which the second integrated circuit has capabilities of a set-top-box in a pay-television system.

30. A first integrated circuit, comprising:
a memory interface configured to receive content from a memory;
a processor configured to request the content from the memory;
a verification block configured to maintain a first running value derived from content received from the memory and further configured to transmit, in a form processed according to a first cryptographic process, the first running value and information representing memory addresses in the memory of the content requested by the processor; and means for impairing operation of the first integrated circuit in response to receiving from a second integrated circuit an impairment signal, the second integrated circuit being arranged to verify content received from the first integrated circuit, to maintain a second running value derived from content received from the first integrated circuit, and to operate a second cryptographic process corresponding to the first cryptographic process to verify that the first running value corresponds to the second running value and to verify that the memory addresses of the content requested from the memory by the processor are within a specified region, the second integrated circuit being further arranged to transmit the impairment signal to the first integrated circuit if the first running value does not correspond to the second running value or if the memory addresses of the content requested from the memory by the processor are not within the specified region.

31. The first integrated circuit of claim 30, further comprising a store arranged to hold minimum and maximum memory addresses of the memory from which content is requested by the processor and wherein the information representing the memory addresses of the content requested by the processor comprises the minimum and maximum memory addresses.

32. The first integrated circuit of claim 30, wherein the verification circuit includes:
a key store that stores an encryption key; and
a signature generator structured to create the first running value from the content received from the memory and encrypt the first running value using the encryption key.

33. A first integrated circuit, comprising:
an interface for receiving, from a second integrated circuit, a first running value and information representing memory addresses in a memory of content received by the second integrated circuit, the first running value being derived from the content received from the memory, the first running value and the information representing the memory addresses being processed according to a first cryptographic process; and
a security block arranged to verify content received from the second integrated circuit, to maintain a second running value derived from the content received from the second integrated circuit, and to operate a second cryptographic process corresponding to the first cryptographic process to verify that the first running value corresponds to the second running value and to verify that the memory addresses of the content received from the memory are within a specified region, the security block being further arranged to impair the operation of the first integrated circuit if the first running value does not correspond to the second running value or if the memory addresses of the content requested from the memory by the processor are not within the specified region.

34. The first integrated circuit of claim 33, wherein the security block includes:
a key store that stores an decryption key; and
a security controller structured to create the second running value from the content received from the second integrated circuit and decrypt the first running value using the decryption key.

35. A method, comprising:
receiving content from a memory;
deriving a first running value from the content received from the memory;
obtaining processed content by processing, according to a first cryptographic process, the first running value and information representing memory addresses in the memory of the content received from the memory;

transmitting the processed content from a first circuit to a second circuit;

receiving the processed content at the second circuit;

operate a second cryptographic process, corresponding to the first cryptographic process, on the processed content;

deriving a second running value from the processed content;

verifying whether the first running value corresponds to the second running value;

verifying whether the memory addresses of the content received from the memory are within a specified region; and impairing the operation of the first circuit if the first running value does not correspond to the second running value or if the memory addresses of the content received from the memory are not within the specified region.

36. The method of claim 35 in which the content received from the memory comprises computer executable instructions.

37. The method of claim 35 in which deriving the first running value includes hashing the content received from the memory.

38. The method of claim 35 in which the processed content is transmitted to the second circuit as a first digital signature that includes a unique number representing a time at which the digital signature was generated.

* * * * *